United States Patent [19]

Issac

[11] Patent Number: 4,726,009
[45] Date of Patent: Feb. 16, 1988

[54] LEVELING DEVICE AND METHOD FOR RECORD PLAYING TURNTABLES

[76] Inventor: Alejandro G. Issac, 3041 Weldon St. No. 307, Los Angeles, Calif. 90065

[21] Appl. No.: 808,495

[22] Filed: Dec. 13, 1985

[51] Int. Cl.$^4$ ............................................... G11B 1/00
[52] U.S. Cl. ...................................... 369/292; 33/371; 33/399; 369/258; 369/264; 369/289
[58] Field of Search ................. 369/292, 75.1, 53, 264, 369/258, 263; 33/389, 390, 370, 371, 333

[56] References Cited

U.S. PATENT DOCUMENTS

| 1,274,333 | 7/1918 | Roland | 33/390 |
| 1,291,230 | 1/1919 | Stitzel | 33/390 |
| 1,409,537 | 3/1922 | Franzen | 33/390 |
| 2,469,795 | 5/1949 | Sproul | 33/371 |
| 3,026,625 | 3/1962 | Cater | 33/390 |
| 3,101,554 | 8/1963 | Gottula | 33/390 |
| 4,085,515 | 4/1978 | Darden | 33/390 |

FOREIGN PATENT DOCUMENTS

| 105682 | 9/1900 | Fed. Rep. of Germany | 33/377 |
| 1295378 | 5/1962 | France | 369/289 |
| 343667 | 12/1959 | Switzerland | 369/263 |

*Primary Examiner*—Steven L. Stephan
*Attorney, Agent, or Firm*—Robert J. Schaap

[57] ABSTRACT

A leveling device and a method of use for record playing turntables to insure that the turntable is completely level around the entire periphery thereof. The leveling device comprises an outer housing having a peripheral section and with an opening in the housing to receive the spindle on the record playing turntable such that it is centrally located on and rests upon the turntable. The housing is provided with a peripheral section having a liquid therein and with the liquid depth being less than the depth of the peripheral section. In this way, the user can determine if the turntable is entirely level around its entire periphery by observing the liquid in the peripheral section of the device to determine if the device is level. If not, the user can make adjustments on the turntable to insure complete leveling thereof.

5 Claims, 4 Drawing Figures

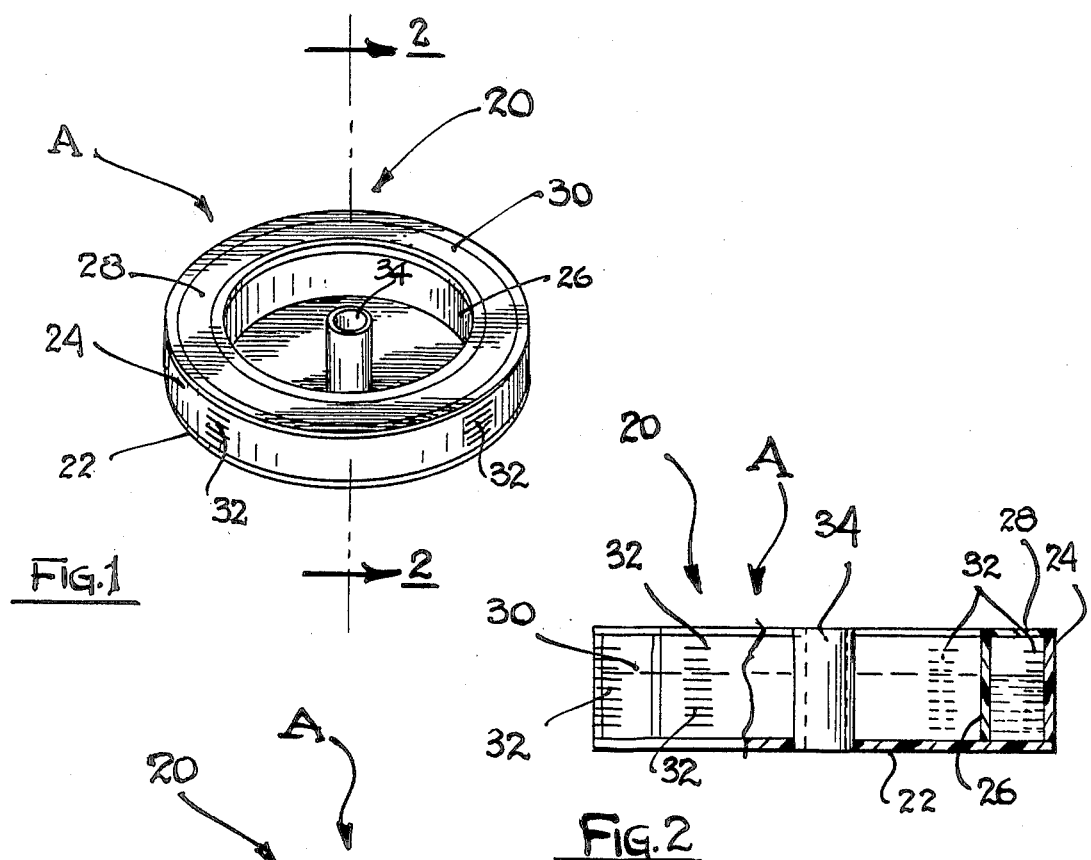
Fig.1
Fig.2
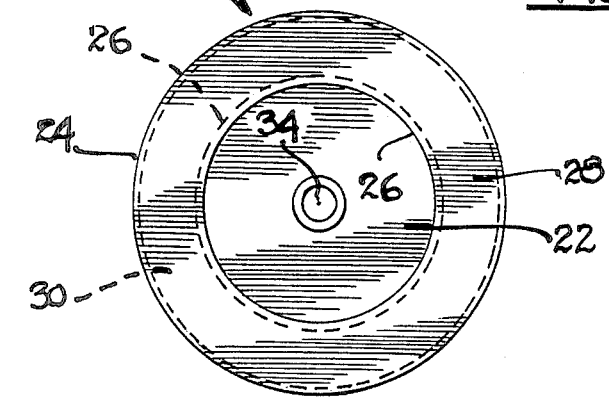
Fig.3
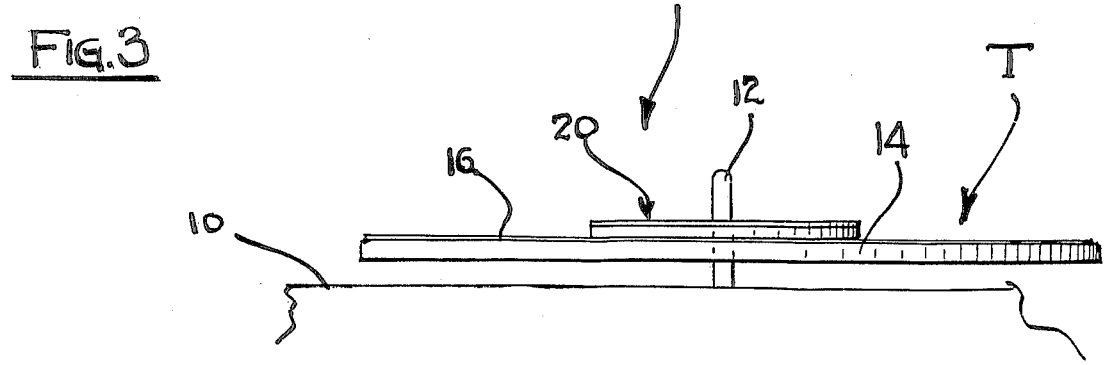
Fig.4

LEVELING DEVICE AND METHOD FOR RECORD PLAYING TURNTABLES

BACKGROUND OF THE INVENTION

1. Field of the Invention

This invention relates in general to certain new and useful improvements in leveling devices for record playing turntables and a method of use therfore, and more particularly, to leveling devices for record playing turntables and a method of use which utilizes a technique for observing the level of a liquid in a peripheral section of a device in order to determine if the entire periphery of the record turntable is level.

2. Brief Description of the Prior Art

It has been well known that it is desirable, if not necessary, to insure complete leveling of a record playing turntable in order to obtain better music reproduction from a record used on that turntable and in order to reduce premature wear of the records. For example, it has been well established that when the record turntable is not completely level, the needle will tend to wear in the grooves of the record to a much greater degree and much more rapidly. This problem is particularly pronounced in the case of stereophonic records. Thus, when the record is rotating on a turntable which is not level, the needle may tend to wear one of the channels to a much greater extent than the other of the channels. This condition results in uneven reproduction of sound and unbalanced sound reproduction.

There have been several proposed devices in the prior art for use in attempting to obtain a leveling of the record playing disc. These devices rely primarily on a bubble located in a body of liquid contained within a small device to be placed on the surface of a record playing turntable. The device generally contains a hemispherical bubble-shaped cap disposed on a base and which is generally almost completely filled with a liquid such as water, except for a small air bubble contained therein. This device is then placed on the surface of a record and moved around the turntable in order to attempt to determine if all peripheral portions of that turntable are level.

This prior art device is not really effective in that it cannot really determine if one portion of the periphery of the turntable is level relative to another oppositely disposed portion of the turntable. Thus, this device can only determine if a small segement of the turntable itself is level. In most cases, it is desirable to measure the level of and determine whether or not the turntable is level by incrementally moving the turntable and determining if successive portions are level. This can be accomplished by slowly rotating the turntable with the hand and also incrementally moving the prior art level device. However, this prior art leveling device when moved at all, causes the liquid bubble to shift such that it does not give an accurate reading and some time is required for settling.

In addition to the above, the aforesaid prior art leveling device is also slow in use and not accurate. Moreover, and due to the fact that it cannot be positioned at the very center of the turntable because of the spindle, the device itself cannot determine proper leveling at the center of the turntable.

OBJECTS OF THE INVENTION

It is, therefore, one of the primary objects of the present invention to provide a leveling device for use with record playing turntables which permits accurate leveling of the turntable at the center thereof.

It is another object of the present invention to provide a leveling device of the type stated which permits complete balancing of a turntable at all portions of the periphery without moving the leveling device.

It is a further object of the present invention to provide a leveling device of the type stated which utilizes a peripheral section of a liquid in order to determine if the entire periphery of the record playing turntable is in a level condition.

It is an additional object of the present invention to provide a leveling device of the type stated which can be manufactured at a relatively low cost and which is highly efficient in operation.

It is another salient object of the present invention to provide a method for determining if the playing surface of a record playing turntable entirely level by examining the level of liquid in a peripheral section of a device to determine if the device is entirely level by reference to the liquid surface.

With the above and other objects in view, my invention resides in the novel features of form, construction, arrangement and combination of parts presently described and pointed out in the claims.

SUMMARY OF THE DISCLOSURE

A leveling device for record playing turntables wherein it is desired to level all portions of the turntable so that the turntable can be level throughout its radius and throughout the entire periphery during rotation thereof.

The leveling device of the present invention comprises an outer housing having a peripheral section, as hereinafter described. A opening is formed in the housing so as to be capable of extending over and around the spindle on the record playing turntable. In this way, the housing can rest upon the exact center of the turntable.

A liquid is contained within the peripheral section of the housing and which liquid is sealed from the remainder of the housing. The liquid, such as water, or for that matter, a colored liquid, has a depth which is less than that of the peripheral section and typically about one-half of the overall depth of the peripheral section. In this way, when the device is disposed centrally on a turntable, by insuring that the liquid is at the same graduation mark or level indicia on the peripheral section, then the turntable itself will be level.

In a more preferred embodiment, the opening which extends through the housing is generally perpendicular to the surfaces of the housing and thus, perpendicular to the surface of the liquid when the latter is in a level condition. The housing is preferably circularly shaped. In addition, the aforesaid graduation marks or other forms of indicia may be located within or on the peripheral section so as to determine if the device is level, that is, when the liquid surface in the peripheral section is the same indicia around the disk.

In a more preferred embodiment of the present invention, the housing comprises a base wall with an enclosing side wall integrally connected to the base wall. An intermediate wall spaced from the outer side wall is located within the housing and thereby forms the peripheral section completely surrounding the housing. A top wall extends over at least the peripheral section above the base wall. The intermediate wall is sealed to the base wall and the top wall to thereby form a completely liquid enclosed interior section. The liquid is disposed within the interior section generally prior to the time that the top wall is sealed to the housing itself.

The present invention provides a method of determining if all of the peripheral portions of a record playing turntable are level and for adjusting the turntable to insure that it is completely level. The method comprises locating the device of the invention having a peripheral section with liquid therein on the spindle of a turntable so that it rests on the turntable. Thereafter, the method comprises examining the level of the liquid in the peripheral section to determine if the turntable is level around the complete periphery by determining if the liquid is at the same indicia level around the entire peripheral section. Thereafter, one can level the turntable by those means associated with the turntable so that the liquid is at the same indicia level around the entire peripheral section to thereby cause the turntable to be level around its entire peripheral section.

This invention possesses many other advantages and has other purposes which may be made more clearly apparent from a consideration of forms in which it may be embodied. These forms are shown in the drawings accompanying and forming part of the present specification. They will now be described in detail, for the purposes of illustrating the general principles of the invention; but it is to be understood that such detailed descriptions are not to be taken in a limiting sense.

BRIEF DESCRIPTION OF THE DRAWINGS

Having thus described the invention in general terms, reference will now be made to the accompanying drawings in which:

FIG. 1 is a perspective view of the leveling device forming part of and embodying the present invention;

FIG. 2 is a vertical sectional view, partially broken away, taken substantially along line 2—2 of FIG. 1;

FIG. 3 is a top plan view of the liquid leveling device of FIGS. 1 and 2; and

FIG. 4 is a side elevational view, partially broken away and showing the use of the leveling device of the present invention located on a record playing turntable.

DETAILED DESCRIPTION OF A PREFERRED EMBODIMENT

Referring now in more detail and by reference characters to the drawings which illustrate a preferred embodiment of the present invention, A designates a leveling device for use with record playing turntables T of the type illustrated in FIG. 4. Generally, the record playing turntable contains a lower base cabinet 10 which generally contains a drive motor and the control electronics and the like (not shown). Extending upwardly from the casing 10 is a spindle 12 which supports a record supporting turntable 14. Generally, the turntable is provided with a protective pad 16 on the upper surface thereof.

The leveling device A of the present invention is shown disposed on the turntable 14 and particularly on the upper pad 16 thereof in the manner as illustrated in FIG. 4. In addition, it can be observed that the leveling device A is centrally located on the turntable itself and is retained in its centrally located position by means of the spindle 12.

The leveling device A generally comprises an outer housing 20 which is comprised of a base wall 22 and an enclosing generally circularly shaped peripheral side wall 24. In this case, the side wall 24 is integral with or otherwise secured to the base wall 22 in a manner such that it is in a fluid tight seal therewith. An intermediate wall 26 which is spaced inwardly from the exterior side wall 24 is also secured to the base wall 22 in the manner as more fully illustrated in FIGS. 2 and 3 of the drawings. This intermediate wall is also vertically located and generally parallel to the outer wall 24. Finally, a top wall 28 may be disposed over and secured both to the upper edges of the peripherally extending side wall 24 and the intermediate wall 26. In this way, a completely sealed liquid tight peripheral section 30 is formed. In the preferred embodiment, the top wall 28 covers only the peripheral section, as shown, for weight reduction, although the top wall could extend completely to the center, if desired.

In a more preferred embodiment, and prior to complete sealing of the top wall 28 to the outer side wall 24 and the intermediate wall 26, a liquid is introduced into the peripheral section 30. In this case, the liquid may be a transparent liquid, or preferably, it may be colored.

One of the preferred liquids for use in the present invention is simply water which may contain a red dye or other colored dye incorporated therein in order to impart some color to the liquid. Other liquids which may be employed, are for example, some of the lower molecular weight alcohols and the like.

The exterior side wall 24 is transparent so that one may easily observe the level of liquid contained within the peripheral section 30. For that matter, it is also preferable to form the top wall 28 of a transparent material, as well. If desired, the intermediate wall 26 may also be formed of a transparent material. Further, at various positions around the entire periphery of the intermediate wall 24, graduation marks 32 are formed therein. These marks may be formed during the actual molding or other formation of the side wall 24 or they may be imprinted thereon.

The outer housing is also provided in the bottom wall 22 with a central opening 34 as illustrated in FIGS. 2 and 3 of the drawings. This opening 34 is sized to receive a conventional spindle 12 on a record playing turntable T.

The housing itself may be formed of any of a number of conventional plastic materials and preferably transparent plastic materials. For example, the housing may be conveniently molded from polyethylene, polystyrene, polybutadiene, etc. Otherwise, the housing may be formed of other materials and preferably of other plastic materials and in other known molding operations.

In use, the leveling device A is disposed on a record playing turntable 14 in the manner as illustrated in FIG. 4 of the drawings. In order to determine if the entire turntable itself is level, the user merely examines the liquid level of the liquid contained within the peripheral section 30. If the liquid surface is not at the same graduation mark 32 around the entire periphery, then by definition, the device itself is not level. As a result, the turntable itself is not level. In this way, the user of the device can then adjust the turntable by adjustment screws or other means which are provided with the turntable. When the user has adjusted the turntable to a desired position, the user can then re-examine the level of liquid within the peripheral section 30. If the liquid level is at the same graduation mark around the entire periphery, then the turntable itself is in a level condition.

More preferably, when desiring to examine the level of a liquid, the user can merely incrementally rotate the turntable slowly and examine the level of the liquid contained within the peripheral section 30 of the housing. If the liquid is at the same indicia level on the device during the incremental measurement of the turntable, then it can be established that the turntable itself is entirely level around the entire periphery.

Thus, there has been illustrated and described a unique and novel leveling device and method for record playing turntables and which enables complete leveling of the entire peripheral section of the turntable by insuring a leveling of a liquid in the peripheral section of the leveling device. it should be understood that many changes, modifications, variations and other uses and applications of the present invention will become apparent to those skilled in the art after considering this specification and the accompanying drawings. Therefore, any and all such changes, modifications, variations and other uses and applications which do not depart from the spirit and scope of the invention are deemed to be covered by the invention.

Having thus described my invention, what I desire to claim and secure by Letters Patent is:

1. A leveling device for record playing turntables, where it is desirable to level all portions of the turntable so that a user can insure a level turntable throughout its circumference, said leveling device comprising:
   (a) a circularly shaped generally flat base wall,
   (b) an enclosing cylindrically shaped annular side wall extending generally perpendicular to and connected to said base wall around the periphery thereof,
   (c) a generally flat top wall extending over said side wall and connected to said side wall forming an interior compartment,
   (d) an intermediate wall in said interior compartment extending between said base wall and top wall and being secured thereto thereby forming a hollow continuous peripheral chamber which extends between said generally flat base wall and said generally flat top wall such that the peripheral chamber has a vertical dimension at least as great as any other portion of the device between the top wall and base wall,
   (e) a vertically disposed centrally located tubular shaft extending between said top wall and said base wall,
   (f) an opening extending through said centrally located shaft of said device and through said base wall to receive a spindle on a record playing turntable,
   (g) level indicia marks on the surface on said enclosing side wall to enable determination of liquid level in said peripheral chamber, and
   (h) a liquid in said peripheral chamber and which liquid is sealed in said peripheral chamber and has a depth less than that of the peripheral chamber, such that when the device is disposed centrally on a turntable, by insuring that the liquid is at the same level indicia marks on the peripheral section, then the turntable will be level around the entire periphery thereof.

2. The leveling device of claim 1 further characterized in that the liquid has a depth which is approximately one-half the depth of the peripheral chamber.

3. The leveling device of claim 1 further characterized in that the opening extends entirely through the central shaft in the housing in a direction perpendicualr to the surface of the liquid when the latter is level.

4. The leveling device of claim 1 further characterized in that the level indicia marks are graduation marks on the peripheral section and are at least on opposite sides of said peripheral section.

5. A leveling device for record playing turntables, where it is desirable to level all portions of the turntable so that a user can insure a level turntable throughout its circumference, said leveling device comprising:
   (a) a circularly shaped generally flat base wall,
   (b) an enclosing cylindrically shaped transparent annular side wall extending generally perpendicular to and connected to said base wall around the periphery thereof,
   (c) a circularly shaped generally flat transparent top wall extending over said side wall and connected to said side wall forming an interior compartment,
   (d) an intermediate wall in said interior compartment extending between said base wall and top wall and being secured thereto thereby forming a hollow peripheral chamber which extends between said generally flat base wall and said generally flat top wall such that the peripheral chamber has a vertical dimension at least as great as any other portion of the device between the top wall and base wall,
   (e) a vertically disposed centrally located tubular shaft extending between said top wall and said base wall and which is perpendicularly arranged with respect to said top wall and base wall,
   (f) a cylindrically shaped opening extending through said centrally located shaft of said device and through said base wall to receive a spindle on a record playing turntable,
   (g) level indicia marks on the surface on said enclosing side wall on at least diameterally opposed portions thereof to enable determination of liquid level in said peripheral chamber, and
   (h) a liquid in said peripheral chamber and which liquid is sealed in said peripheral chamber and has a depth less than that of the peripheral chamber, such that when the device is disposed centrally on a turntable, by insuring that the liquid is at the same level indicia marks on the peripheral section, then the turntable will be level around the entire periphery thereof.

* * * * *